(No Model.)
A. ESP.
SPRING EQUALIZER.
No. 348,272. Patented Aug. 31, 1886.
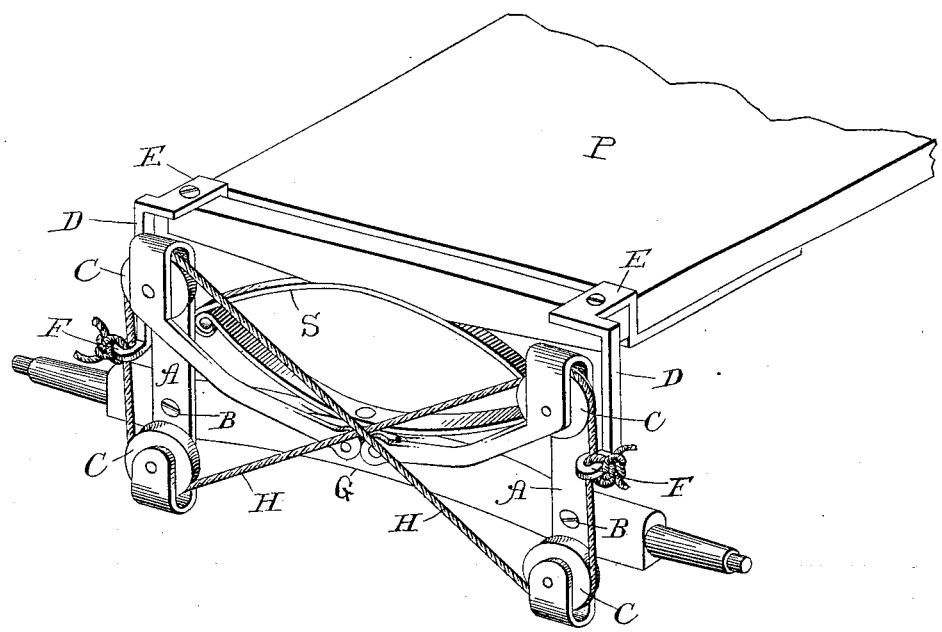
Witnesses:
Chas. Wicks.
Henry Gaddis
Inventor.
Andrew Esp

UNITED STATES PATENT OFFICE.

ANDREW ESP, OF McCUNE, KANSAS.

SPRING-EQUALIZER.

SPECIFICATION forming part of Letters Patent No. 348,272, dated August 31, 1886.

Application filed February 23, 1886. Serial No. 192,955. (No model.)

*To all whom it may concern:*

Be it known that I, ANDREW ESP, a citizen of the United States, residing at McCune, in the county of Crawford, State of Kansas, have invented certain new and useful Improvements in Spring-Equalizers; and I do hereby declare the following to be a full, clear, and exact description of the invention, such as will enable others skilled in the art to which it appertains to make and use the same.

My invention relates to improvements in spring-equalizers adapted to be used with all classes of vehicles, in which the bed or platform of the vehicle is hung or supported on springs; and has for its object to produce an even pressure upon the springs, and prevent the unsteady rocking movement of the bed or platform, which results from an unequal distribution of load upon the bed or platform.

The particular construction and arrangement of the various parts of my invention, I will now proceed to point out and describe, reference being had to the accompanying drawing, in which the figure is a perspective of one end of the bed or platform of a vehicle supported upon a spring secured to the axle, and provided with my invention.

Referring to said drawing, G represents one of the axles of a vehicle; S, a spring secured to said axle, and P, the bed or platform of the vehicle secured to the spring S.

A A are upright brackets bolted to opposite ends of the axle at B B, and provided on their upper and lower ends with pulleys C.

D D are pendent arms secured to opposite corners of the bed or platform P at E E, and having on their lower ends eyes F F.

H H are ropes, the ends of which are secured to the eyes F F of the arms D D, each of said ropes passing around the diagonally-opposite pulleys C, as shown in the drawing. When there is an excess of weight on either side of the bed or platform of the vehicle, the rope on that side which passes over the approximate upper pulley draws down on the arm on the opposite side of the bed or platform, and thus equalizes the pressure on the springs.

Having thus fully described my invention, what I claim as new, and desire to secure by Letters Patent, is—

In a spring-equalizer, the combination, with the bed or platform of a vehicle supported by a spring secured to the axle, of the pendent arms D D, secured to the bed or platform, the brackets A A, secured to the axle and provided with the upper and lower pulleys C, and the ropes H H, secured to the arms D D, and passing around the diagonally-opposite pulleys C, all arranged and operating substantially as shown and described.

ANDREW ESP.

Witnesses:
H. GADDIS,
CHARLES WEEKS.